United States Patent
Afzal et al.

(10) Patent No.: US 11,716,677 B2
(45) Date of Patent: Aug. 1, 2023

(54) HANDLING RADIO ACCESS TECHNOLOGIES BASED ON CORE NETWORK FAILURES

(71) Applicant: T-Mobile USA, Inc., Bellevue, WA (US)

(72) Inventors: Muhammad Waqar Afzal, Bellevue, WA (US); Suresh Thanneeru, Redmond, WA (US); Suliman Albasheir, Issaquah, WA (US); Rahul Pal, Bellevue, WA (US); Karunakalage Viraj Rakitha Silva, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 23 days.

(21) Appl. No.: 17/220,181

(22) Filed: Apr. 1, 2021

(65) Prior Publication Data

US 2022/0322210 A1   Oct. 6, 2022

(51) Int. Cl.
*H04W 4/00*     (2018.01)
*H04W 48/16*    (2009.01)
*H04W 36/00*    (2009.01)
*H04W 24/04*    (2009.01)
*H04W 48/06*    (2009.01)

(52) U.S. Cl.
CPC .......... *H04W 48/16* (2013.01); *H04W 24/04* (2013.01); *H04W 36/0079* (2018.08); *H04W 48/06* (2013.01)

(58) Field of Classification Search
CPC ..... H04W 48/06; H04W 48/16; H04W 24/02; H04W 24/04; H04W 36/0079; H04W 36/30; H04W 36/18; H04W 36/08; H04W 36/14; H04W 36/12; H04W 24/00; H04W 24/08; H04W 88/08; H04B 17/0042
USPC ................... 370/329; 455/424, 436
See application file for complete search history.

(56) References Cited

U.S. PATENT DOCUMENTS

| | | | |
|---|---|---|---|
| 2019/0082350 A1* | 3/2019 | Kim | H04W 72/12 |
| 2020/0045626 A1* | 2/2020 | Kim | H04W 48/20 |
| 2020/0084818 A1* | 3/2020 | Xu | H04W 36/0079 |
| 2020/0107253 A1 | 4/2020 | Albasheir | |
| 2020/0351756 A1* | 11/2020 | Jager | H04L 47/24 |

FOREIGN PATENT DOCUMENTS

EP   3720236 A1   10/2020
WO   WO2021042381 A1   3/2021

OTHER PUBLICATIONS

Extended European Search Report dated Jul. 27, 2022 for European Patent Application No. 22164438.8, 13 pages.

* cited by examiner

*Primary Examiner* — Temica M Beamer
(74) *Attorney, Agent, or Firm* — Lee & Hayes, P.C.

(57) ABSTRACT

Systems, devices, and techniques described herein relate to prioritizing access by first user equipment (UEs) connected to a first radio access technology (RAT) type over access by second UEs connected to a second RAT type responsive to a failure of a core network node. A node of the core network, such as a session management node, may determine that another node of the core network has failed based on a negative response or no response from that other node. The node may then prioritize access based on RAT types of requesting UEs.

20 Claims, 4 Drawing Sheets

HANDLING RADIO ACCESS TECHNOLOGIES BASED ON CORE NETWORK FAILURES

BACKGROUND

Modern terrestrial telecommunication systems include heterogeneous mixtures of second, third, fourth, and fifth generation (2G, 3G, 4G, and 5G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunications technologies.

These telecommunications technologies are associated with radio access technologies (RATs) serving user equipment (UEs) at base stations, such that a UE may be served by a 5G RAT, a 4G RAT, etc. Each telecommunications technology may also be associated with a core network that is capable of working with RATs of the same technology and also with RATs of other technologies. For example, a 5G core network may work with 5G RATs and 4G RATs, and a 4G core network may work with 4G, 3G, and 2G RATs.

When a core network node fails, service may either be discontinued to a UE, regardless of the RAT it is connecting through, or maintained, again regardless of the RAT used. Both options are often poor choices for the telecommunications service provider.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Systems, devices, and techniques described herein relate to prioritizing access by first user equipment (UEs) connected to a first radio access technology (RAT) type over access by second UEs connected to a second RAT type responsive to a failure of a core network node. A node of the core network, such as a session management node, may determine that another node of the core network has failed based on a negative response or no response from that other node. The node may then prioritize access based on RAT types of requesting UEs.

In various implementations, a session management node determines that another node of its core network has failed in response to a request received from a UE, such as a session request. Upon receiving such a request (or notification of the request from another node), the session management node communicates with one or more other nodes of the core network regarding the UE request. If the session management node receives a negative response (e.g., negative acknowledgement ("NACK") or indication of congestion) or no response, the session management node determines that the negative/non-responsive node has failed.

In response to determining that a node has failed, the session management node determines if the failure calls for any RAT-type-specific actions, such as prioritizing one RAT type over another. For example, if the requesting UE is connected to the network through a RAT of a first RAT type, the session management node may acknowledge the request and allow the communication session. If the requesting UE is connected to the network through a RAT of a second RAT type, however, the session management node may deny the UE's request (e.g., respond to the request with a NACK). In some implementations, the NACK or other message denying the request may include an instruction to the UE to fallback to a RAT of the first RAT type and, if the UE's request is renewed with connected to the RAT of the first RAT type, the session management node may allow the request. In this way, the session management node may prioritize the first RAT type over the second RAT type.

In further examples, actions taken by the session management node to prioritize the first RAT type over the second RAT type may be driven by the identity of the failed node, the type of session associated with the UE's request, etc.

In some implementations, the above-described core network may be a 5G core network, the session management node may be a SMF, and the RAT types may be 5G and 4G. Different ones of 5G RATs or 4G RATs may be prioritized depending on which node (e.g., network function) of the 5G core network fails.

In further implementations, the core network may instead be a 4G core network, the session management node may be a packet data network gateway (PGw), and the RAT types may be 4G and at least one of 3G or 2G.

Figure 1:
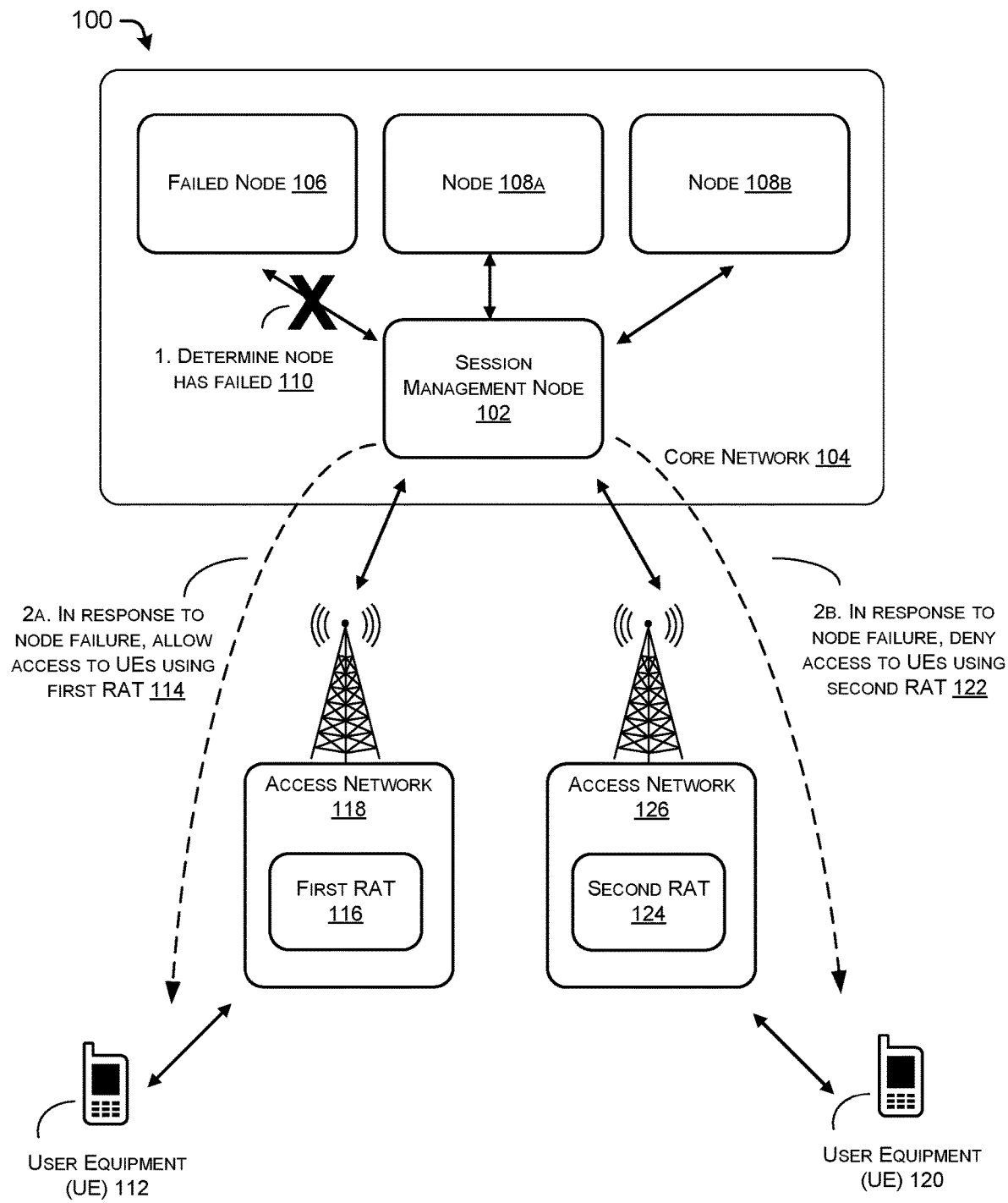
FIG. 1 is a diagram illustrating example nodes and devices, including a session management node configured to determine that a node of a core network has failed and, in response, to prioritize one type RAT over another RAT type.

FIG. 1 is a diagram 100 illustrating example nodes and devices, including a session management node configured to determine that a node of a core network has failed and, in response, to prioritize one type RAT over another RAT type. As illustrated, a session management node 102 of a core network 104 has communication interfaces with other nodes of the core network 104, including nodes 106, 108a, and 108b. At 110, the session management node 102 determines that the node 106 has failed (and, hence, is also referred to herein as "failed node 106"). In response, the session management node 102 prioritizes a first RAT type over a second RAT type. That prioritizing may include communicating with a UE 112 to allow, at 114, access by the UE 112 based on a request from the UE 112 indicating that the UE 112 is connected to a first RAT 116 of the first RAT type via an access network 118. The prioritizing may also include communicating with a UE 120 to deny, at 122, access by the UE 120 based on a request from the UE 120 indicating that the UE 120 is connected to a second RAT 124 of the second RAT type via an access network 126.

The elements 102-126 of diagram 100 represent physical infrastructure, software, and operations. For clarity, infrastructure will be described first, followed by software, followed by operations.

In various implementations, the nodes 102, 106, 108a and 108b of the core network 104 may be implemented on any one or more computing devices, such as the computing device(s) illustrated in FIG. 4 and described below in detail with reference to that figure. Each node of the core network 104 may be a separate computing device. Alternatively, any one or more of the nodes of the core network 104 may be implemented on a same computing device. In some implementations, one or more of the nodes may be implemented on other devices illustrated in FIG. 1, such as the device(s) constituting the access network 120 or access network 126. Each node, including session management node 102, failed node 106, and nodes 108a and 108b is at least a software unit that may or may not be its own physical device—physical device implementation of the nodes may vary based on network design constraints.

In some examples, the nodes of the core network 104 may be implemented on one or more server device that are connected to multiple access networks 120 and 126 by means of fiberoptic cables or other physical backhaul. Other connection mechanisms, such as wireless backhaul, may also be used in connecting access network 120 devices and access network 126 devices to core network 104 devices, and, collectively, the devices of the access network 120, access network 126, and the core network 104 may comprise at least a part of the devices implementing services of a telecommunications network operator.

The access networks 120 and 126 may each comprise any physical computing device(s) with one or more antennae or other mechanism for transmitting and receiving radio waves at various radio frequencies (RFs). For example, the access networks 120 and 126 may each be a base station at a cellular ("cell") site comprising a cell tower, computing devices and power equipment, and an antenna array. Such base stations could be gNodeBs (gNBs), eNodeBs (eNBs), or NodeBs (NB), respectively for 5G, 4G, and 3G access networks 120 or 126. Alternatively, the access networks 120 and 126 may each comprise a router, repeater, or other computing device configured to send and receive communications over unlicensed wireless spectrum. Additionally, the access networks 120 and 126 can each include any number and type of base stations representing any number and type of macrocells, microcells, picocells, or femtocells, for example, with any type or amount of overlapping coverage or mutually exclusive coverage.

As noted, the access networks 120 and 126 may each include multiple different RATs, such as the first RAT 116 or second RAT 124. Alternatively, the access networks 120 and 126 may each comprise only one of first RAT 116 and second RAT 124. The first RAT 116 is accessible to the UE 112 at the location of the UE 112 when operations such as those shown at 110 and 114 are performed. The second RAT 124 is accessible to the UE 120 at the location of the UE 120 when operations such as those shown at 110 and 122 are performed. Examples of RATs include 2G RATs such as GSM; 3G RATs such as UMTS; 4G RATs such as LTE, LTE Advanced, and HSPA+; 5G RATs such as NR; and RATs using unlicensed spectrum, such as Unlicensed Mobile Access (UMA), WiMAX, Wi-Fi, or other RATs utilizing Institute of Electrical and Electronics Engineers' (IEEE) 802.1x protocols.

In accordance with various implementations described herein, the terms "user equipment (UE)," "user device," "wireless communication device," "wireless device," "communication device," "mobile device," and "client device," can be used interchangeably herein to describe any UE (e.g., the UE 112, the UE 120, etc.) that is capable of transmitting/receiving data wirelessly using any suitable wireless communications/data technology, protocol, or standard, such as those described herein for the first RAT 116 and second RAT 124. The UE 112 and UE 120 can each be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

The UE 112 and UE 120 may each be configured to transmit and receive RF signals and may include a network stack to interface between software components, such as dialers, messaging components, web browsers, etc. and hardware components of that UE. The components of the UE 112 may initiate sessions with a telecommunications network by, e.g., sending requests through an access network 120. The components of the UE 120 may initiate sessions with a telecommunications network by, e.g., sending requests through an access network 126. Upon each successful set-up of a session, the UE 112 or the UE 120 may communicate using one or more software components such as a dialer, video calling application, etc. In some implementations, one of more of these communications may be formulated as session initiation protocol (SIP) requests or other SIP communications. In addition to setting up and engaging in communications, the UE 112 or the UE 120 (or both) may receive instructions to fallback from a current RAT to a different RAT or to initiate or participate in a handover to a different RAT. Falling back or handing over may involve switching access network when the RATs are each associated with a different access network. Further, UE 112 and UE 120 may each measure performance of surrounding access networks and RATs for signal strength, packet loss, congestion, etc. and send measurement reports to the telecommunication network through its respective access network 120 or access network 126.

In various implementations, the functionality of the access network 120 or 126 may depend on the RATs it supports. An access network 126 supporting a 5G RAT may be configured and equipped as a gNB, whereas an access network 120 supporting only 4G and/or previous generation RATs may be equipped and configured as an eNB.

The core network 104 may also vary in the nodes it includes and the RATs it supports. Example core networks 104 include a 5G core network (5GC) and a 4G/LTE core network, such as a system architecture evolution (SAE) core network. Both the 5GC and SAE core networks may implement an Internet Protocol (IP) multimedia subsystem (IMS) core (sometimes referred to as the "IMS core network," the "IMS network," etc.). IMS is an architectural framework defined by the 3GPP for delivering IP multimedia to a UE, such as the UE 112 and UE 120. The IMS core can provide IMS-based services to users who are associated with UEs, such as offering multimedia telephony services that allow a user to call or message other users via the IMS core using his/her UE.

Figure 2:
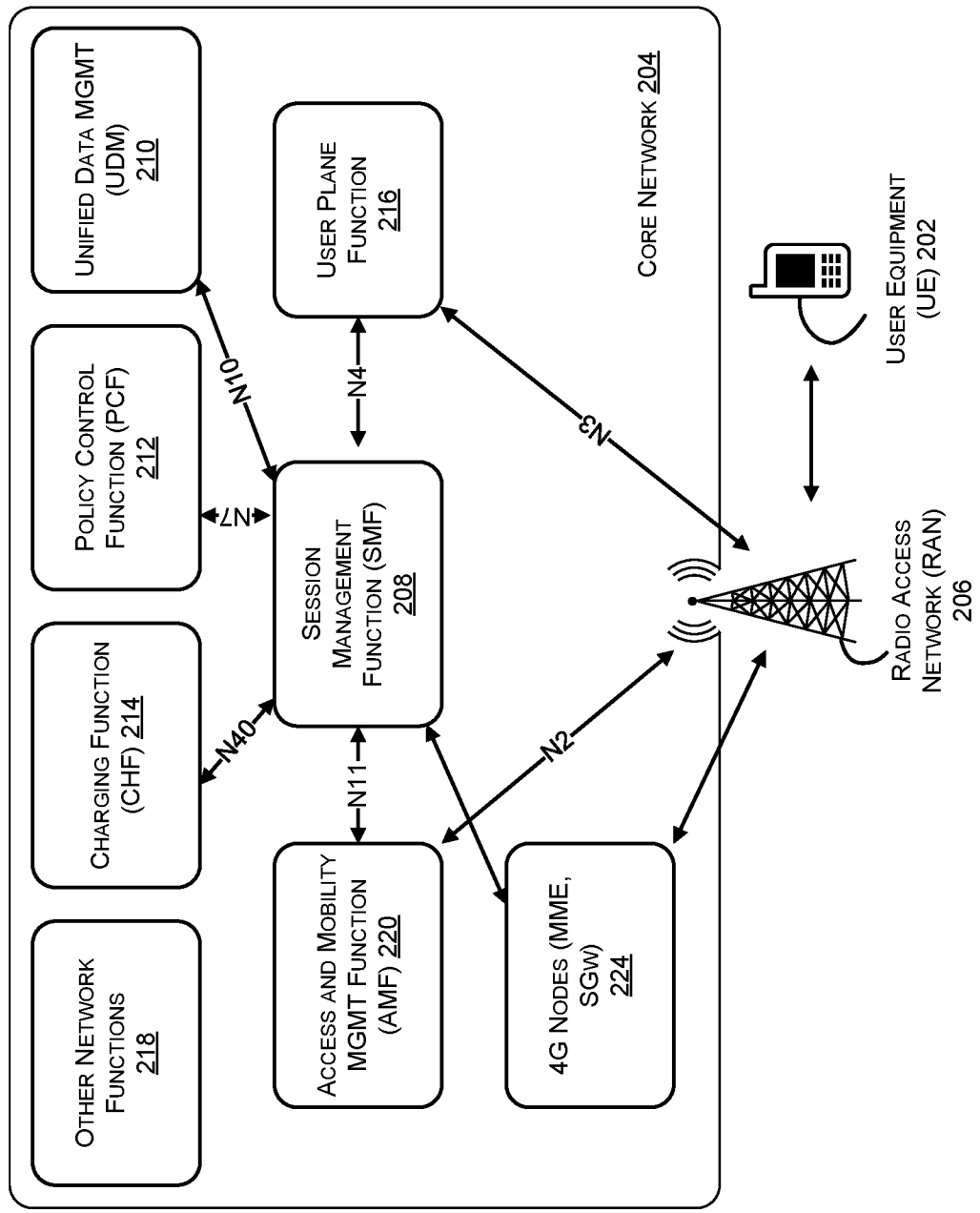
FIG. 2 is a diagram of an example environment where the core network is a 5G core network and the session management node is a session management function (SMF).

FIG. 2. illustrates an example of a core network 104 implemented as a 5GC. As shown, the core network 204 (an example of core network 104) may include an SMF 208 (an example of session management node 102) and a unified data management (UDM) 210 function, a policy control function (PCF 212), a charging function (CHF) 214, and a user plane function (UPF) 216 (any of which may be an example of failed node 106 or of a node 108a or 108b). The core network 204 may also include other network functions (NFs) 218 and an access and mobility management function (AMF) 220 (any of which may be an example of a node 108a or 108b), as well as elements 224 of a SAE core network to support access networks (e.g., access network 120) offering 4G RATs. As noted herein, these elements of FIG. 2 may be implemented on one or more computing devices. Additionally, the elements of FIG. 2 may be implemented as a network slice for a specific service (e.g., video over NR), with each node of the core network 204 (also referred to herein as NFs) being an instantiation of that network slice reserved for that specific service. Further, the core network 204 may include elements from both a control plane (e.g., SMF 208, UDM 210, PCF, 212, CHF 214, AMF 220, etc.) and a user plane (e.g., UPF 216). The UE 202 may be an example of UE 112 or UE 120, and the access network 206 may be an example of access network 120 or access network 126.

In various implementations, the SMF 208 may include functionality to manage communication sessions by and between UEs, such as UE 202, or other sessions (e.g., streaming by a UE 202 from a data network). Additionally, the SMF 208 may provide IP addresses to the UEs. The SMF 208 may be connected to the UDM 210 via a N10 interface, to the PCF 212 via a N7 interface, to the CHF 214 via a N40 interface, to the UPF 216 via an N4 interface, and to the AMF 220 via an N11 interface.

The UDM 210 can be implemented as a network function including functionality to process authentication credentials, handle user identification processing, manage registration and/or mobility, manage subscriptions between a UE and a carrier, and/or manage short message service (SMS) data.

In some implementations, the PCF 212 includes functionality to support a unified policy framework for governing network behavior, providing policy rules to control plane functions and/or enforcing such rules, and/or implementing a front end to access subscription information relevant for policy decisions in a data repository.

In further examples, the CHF 214 includes functionality to offer charging services to other NFs of the core network 204.

In various implementations, the UPF 216 can be implemented as a network function including functionality to control data transfer between the UE 202 and the various components of the network. The UPF 216 may be connected to an access network 206, for instance, via a N3 interface. In some instances, UPF 216 can include functionality to act as an anchor point for RAT handover (e.g., inter and intra), external protocol data unit (PDU) session point of interconnect to a data network (e.g., the Internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be one or more UPFs in addition to UPF 216, which are associated with a network and/or with the UE 202.

The AMF 220 can be implemented as a network function including functionality to provide UE-based authentication, authorization, mobility management, etc., to various UEs. In some instances, the AMF 220 can include functionality to terminate an access network control plane interface between the UE 202 and other functions on the network. Additionally, the AMF 220 can include functionality to perform registration management of the UE 202 in a network, connection management, reachability management, mobility management, access authentication, access authorization, security anchor functionality (e.g., receiving and/or transmitting security keys during registration/authorization), and the like. As illustrated in FIG. 2, the AMF 220 may be connected to the access network 206 via a N2 interface.

A 5GC, such as core network 204, may also typically include other NFs in addition to those specifically shown. Such other NFs are represented in FIG. 2 as other NFs 218. Examples of other NFs 218 may include a network exposure function (NEF), an authentication server function (AUSF), a network resource function (NRF), an equipment identity register (EIR), a network slice selection function (NSSF), a unified data repository (UDR), and an application function (AF). These other NFs 218 may be connected to any of the specific NFs shown in FIG. 2 and/or to each other be specified Nx or Nxx interfaces defined by the 3GPP. The other NFs 218 may also represent any of nodes 108a or 108b in FIG. 1 and, to the extent they are connected to SMF 208, they may represent failed node 106 of FIG. 1.

In some implementations, the core network 204 supports both 5G and earlier generation technologies, such as 4G. Connectivity between an access point 206 that includes a 4G RAT and other components of the core network 204 may be by way of 4G core components 224, such as a serving gateway (SGw) and a mobility management entity (MME). In one example, the access network 206 may be connected to the MME and SGw 224, and those elements in turn to the SMF 208. In another example, the access network 206 may be connected to the MME 224, and the MME 224 may be connected to the AMF 220. In these and other examples, the use of adapted legacy components 224 in the core network 204 allows that core network 204 to serve multiple RATs.

Returning to FIG. 1, core network 104 may alternatively be an SAE core network with a PGw serving as the session management node 102. The PGw may be connected to each of the access network 120 and access network 126 via a SGw and a MME and may also be connected to one or more other nodes of the SAE core network (e.g., a policy and charging rules function (PCRF), an enhanced packet data gateway (ePDG), an authentication, authorization, and accounting (AAA) platform, etc.). In addition to supporting access networks 120/access networks 126 with 4G RATs, the SAE core network 104 may also support access networks 120/access networks 126 with 3G RATs and/or 2G RATs.

Turning now to the operations of the components described herein and illustrated in FIG. 1, the session management node 102 is shown determining, at 110, that node 106 has failed and in response, prioritizing a first RAT type over a second RAT type. These operations represent any failures of nodes of a core network 104 determined by the session management node 102, as well as any action or set of actions that may be said to prioritize between or among RAT types.

In a first example, the session management node 102 may determine, at 110, that node 106 has failed because of a NACK or lack of response. In such an implementation, the failed node 106 may be one of a UDM 210, a PCF 212, or a CHF 214, and the session management node 102 may be an SMF 208. Prior to the determination at 110, the session management node 102 may receive a request from a UE 112 or UE 120, such as a session initiation request. That request, or a related communication, may be communicated to the node 106 and when no response is received or a NACK is received, the session management node 102 determines that the node 106 has failed. The failure of node 106 may trigger RAT prioritization logic of the session management node 102. Such logic may determine that a first RAT type should be prioritized over a second RAT type. When the UE 112 associated with the request is connected via a first RAT 116 of the prioritized first RAT type, the session management node 102 may respond to the request, at 114, by allowing the requested communication session. When the UE 120 associated with the request is connected via a second RAT 124 of the second RAT type, the session management node 102 may respond to the request, at 122, by denying the requested communication session. Additionally, in the response at 122, the session management node 102 may include an instruction to fallback from the second RAT 124 to a RAT of the first RAT type or to initiate a handover to a RAT of the first RAT type (assuming that such a RAT is available).

In another example, the session management node 102 may determine, at 110, that node 106 has failed because of response indicating congestion. In such an implementation, the failed node 106 may be a UPF 216 and the session management node 102 may be an SMF 208. Prior to the determination at 110, the session management node 102 may receive a request from UE 112 or UE 120, such as a session initiation request. That request, or a related communication, may be communicated to the node 106 and when the congestion response is received, the session management node 102 determines that the node 106 has failed. The failure of node 106 may trigger RAT prioritization logic of the session management node 102, as discussed above.

In a further example, the core network 104 may be a SAE core network, the session management node 102 may be a PGw, the first RAT 116 may be 4G and the second RAT 124 may be at least one of 2G and 3G. The session management node 102 may determine, at 110, that node 106 has failed because of a NACK or lack of response. The failed node 106 may be a PCRF or other SAE node connected to the PGw. Prior to the determination at 110, the session management node 102 may receive a request from UE 112 or UE 120, such as a session initiation request. That request, or a related communication, may be communicated to the node 106 and when no response is received or a NACK is received, the session management node 102 determines that the node 106 has failed. The failure of node 106 may trigger RAT prioritization logic of the session management node 102, as discussed herein.

In various implementations, the RAT prioritization logic of the session management node 102 may be updated to allow alternate or additional prioritizations among RAT types. Such prioritizations may result from machine learning or may be entered through a management system (e.g., operations support system, etc.).

Figure 3:
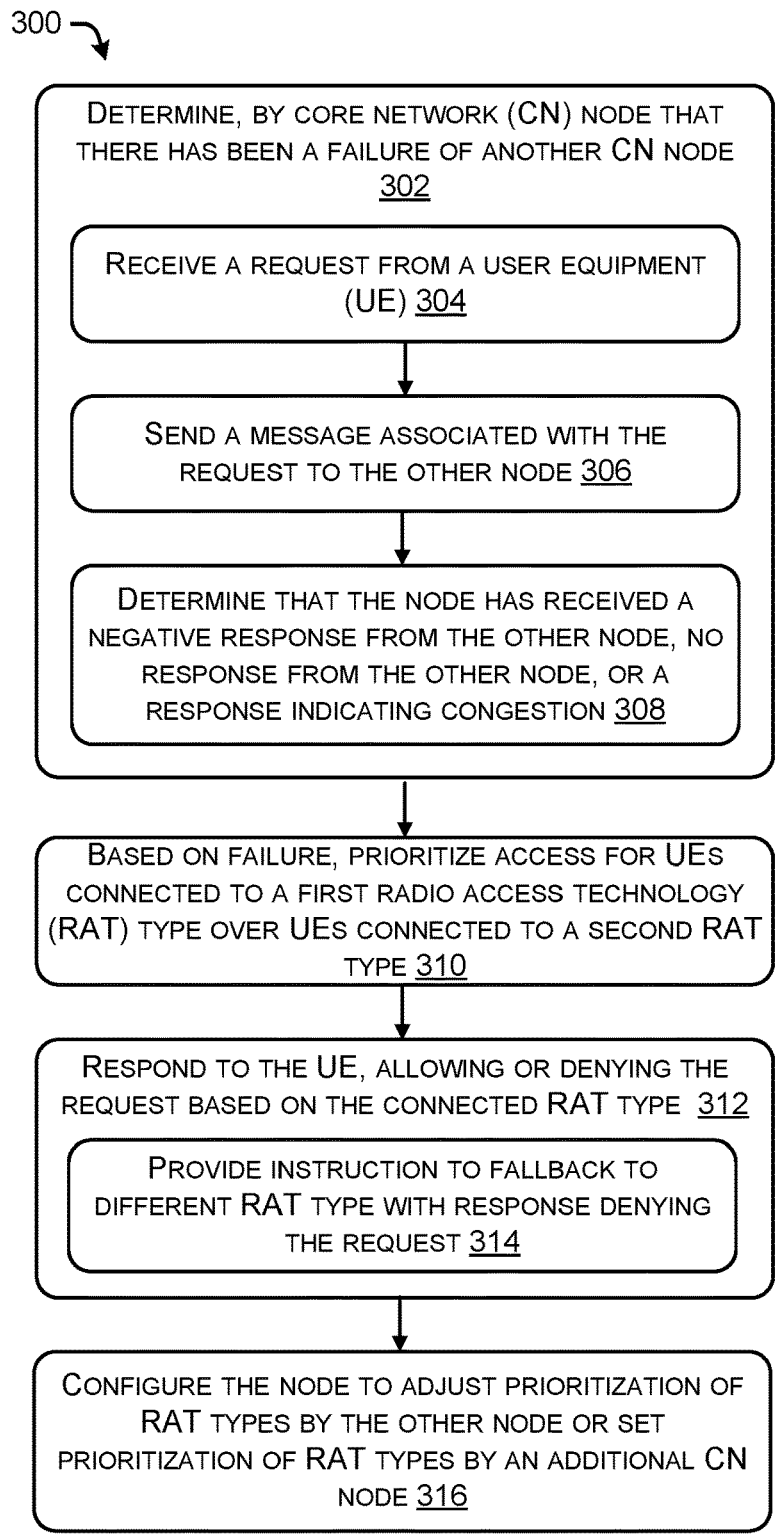
FIG. 3 is a flow diagram illustrating an example method for prioritizing one RAT type over another RAT type responsive to a failure of a node of a core network.

FIG. 3 illustrates an example process in accordance with embodiments of the disclosure. The process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 3 is a flow diagram illustrating an example method for prioritizing one RAT type over another RAT type responsive to a failure of a node of a core network. That method, implemented as a process 300, may be performed by a node of a core network, such as an SMF or other session management node.

As illustrated, at 302, the node determines that there has been a failure of another node of the core network. That determining may include receiving, at 304, a request from a UE; sending, at 306, a message associated with the request to the other node; and determining, at 308, that the node has received a negative response, no response, or a response indicating congestion from the other node. In some implementations, the core network may be a 5G core network and the other node may be a NE, such as a UDM, a CHF, a PCF, or a UPF. In further implementations, the core network may be a 4G core network.

At 310, based at least in part on determining that there has been a failure of the other node, the node determines that the UE should prioritize access by first UEs connected to a first RAT type over access by second UEs connected to a second RAT type. In some implementations, the first RAT type may be 4G (e.g., LTE) and the second RAT type may be 5G (e.g., NR). In other implementations, the first RAT type may be the 5G and the second RAT type may be the 4G. In yet other implements, the first RAT type may be 3G or 2G and the second RAT type may be 4G or, if specified by a configuration of the node, the first RAT type may be 4G and the second RAT type may be 3G or 2G.

At 312, the node responds to the UE, allowing or denying the request based on the RAT type of the RAT that the UE is connected to. If the UE is connected to a RAT of the second RAT type and the node is denying the request, the responding may include, at 314, responding to the request from the UE with an instruction to fallback to a RAT of the first RAT type.

At 316, the node may be configured to adjust prioritization of RAT types associated with failures of the other node or set prioritization of RAT types for failures of an additional node of the core network. Such prioritization adjustment or setting may occur before, during, or after any of operations 302-314.

Figure 4:
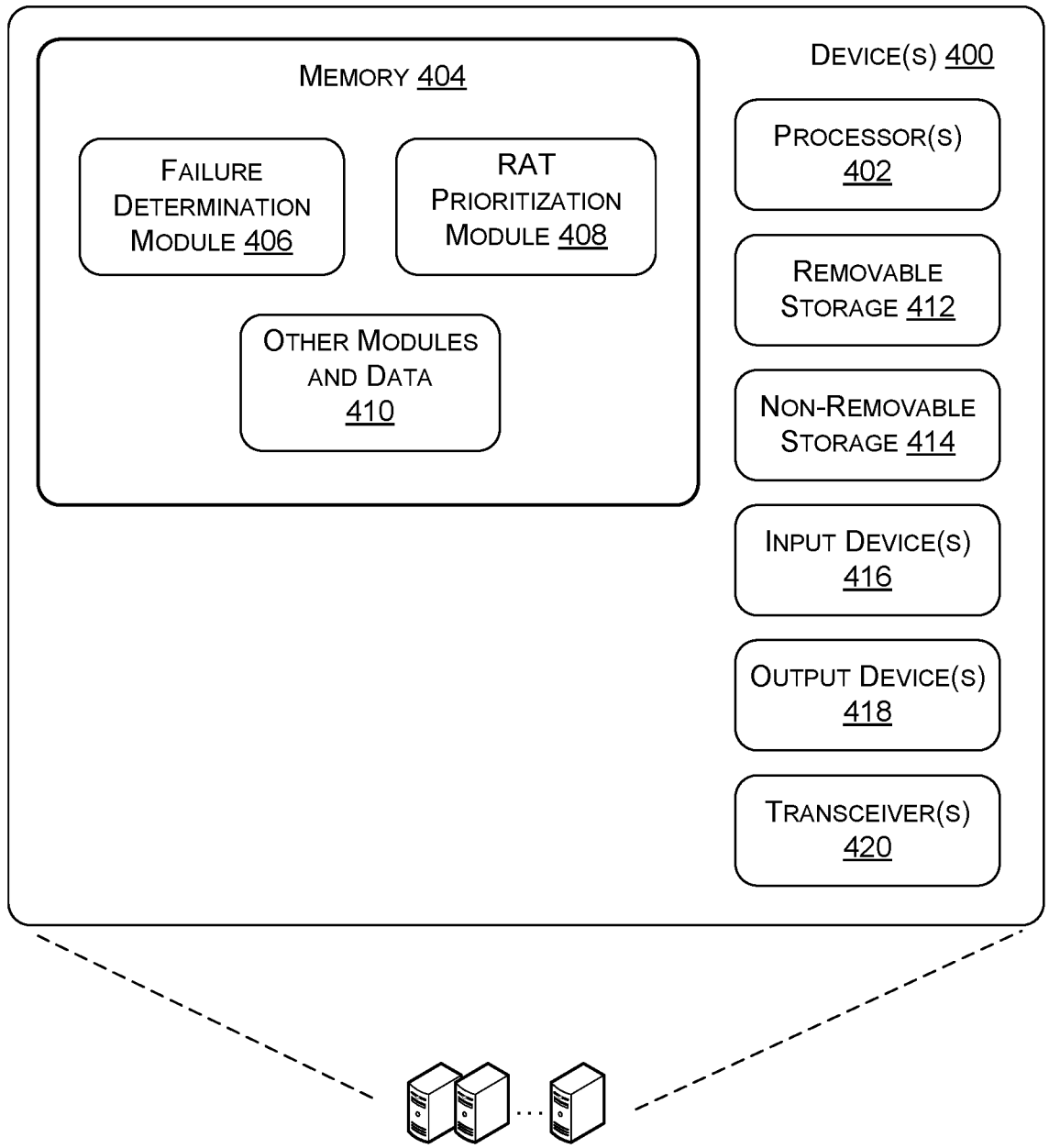
FIG. 4 is a block diagram of an example node of a core network configured to implement various functionalities described herein.

FIG. 4 is a block diagram of example device(s) 400 configured to implement various functionalities of the node of the core network described herein. In various implementations, some or all of the functionality discussed in connection with FIGS. 1-3 can be implemented in the device(s) 400. Further, the device(s) 400 can be implemented as one or more server computers, a network element on a dedicated hardware, as a software instance running on a dedicated hardware, or as a virtualized function instantiated on an appropriate platform, such as a cloud infrastructure, and the like. It is to be understood in the context of this disclosure that the device(s) 400 can be implemented as a single device or as a plurality of devices with components and data distributed among them.

As illustrated, the device(s) 400 comprise processor(s) 402 and a memory 404 storing a failure determination module 406, a RAT prioritization module 408, and other modules and data 410. Also, the device(s) 400 include at least one removable storage 412 and at least one non-removable storage 414, input device(s) 416, output device(s) 418, and transceiver(s) 420.

In some embodiments, the processor(s) 402 is a central processing unit (CPU), a graphics processing unit (GPU), or both CPU and GPU, or other processing unit or component known in the art.

In various embodiments, the memory 404 is volatile (such as RAM), non-volatile (such as ROM, flash memory, etc.) or some combination of the two. The fault determination module 406, RAT prioritization module 408, and other modules and data 410 may be any one or more applications or any other sort of executable instructions. The fault determination module 406 may determine that a node of the core network (e.g., a UDM) has failed. The RAT prioritization module 408 may determine how the node failure should be handled—what RAT type should be prioritized, if any—and to respond to UE requests accordingly. Both modules 406 and 408 may be representative of the logic and operations described above in detail with respect to FIGS. 1-3. The other modules and data 410 may comprise additional functions and structures that are not fully described herein.

The device 400 also includes additional data storage devices (removable and/or non-removable) such as, for example, magnetic disks, optical disks, or tape. Such additional storage is illustrated in FIG. 4 by removable storage 412 and non-removable storage 414. Tangible computer-readable media can include volatile and nonvolatile, removable and non-removable media implemented in any method or technology for storage of information, such as computer readable instructions, data structures, program modules, or other data. Memory 404, removable storage 412 and non-removable storage 414 are all examples of computer-readable storage media. Computer-readable storage media include, but are not limited to, RAM, ROM, EEPROM, flash memory or other memory technology, CD-ROM, digital versatile discs (DVDs), content-addressable memory (CAM), or other optical storage, magnetic cassettes, magnetic tape, magnetic disk storage or other magnetic storage devices, or any other medium which can be used to store the desired information and which can be accessed by the device 400. Any such tangible computer-readable media can be part of the device 400.

The device 400 also can include input device(s) 416, such as a keypad, a cursor control, a touch-sensitive display, voice input device, etc., and output device(s) 418 such as a display, speakers, printers, etc. These devices are well known in the art and need not be discussed at length here.

As illustrated in FIG. 4, the device 400 also includes one or more wired or wireless transceiver(s) 420. For example, the transceiver(s) 420 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 420 can utilize multiple-input/multiple-output (MIMO) technology. The transceiver(s) 420 can comprise any sort of wireless transceivers capable of engaging in wireless, radio frequency (RF) communication. The transceiver(s) 420 can also include other wireless modems, such as a modem for engaging in Wi-Fi, WiMAX, Bluetooth, or infrared communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented in a node of a core network, the method comprising:
    determining that there has been a failure of another node of the core network; and
    in response to the failure of the other node and based on radio access technology (RAT) types that user equipment (UEs) are connected to, prioritizing access by first UEs connected to a first RAT type over access by second UEs connected to a second RAT type,
    wherein the first RAT type and the second RAT type are different RAT types.

2. The method of claim 1, wherein the determining further comprises:
    receiving a request from one of the first UEs or the second UEs;
    sending a message associated with the request to the other node; and
    determining that the node has received a negative response or no response from the other node.

3. The method of claim 2, wherein the prioritizing comprises responding to requests from the second UEs with denials of communication sessions requested by the second UEs.

4. The method of claim 3, further comprising:
    receiving a second request from one of the second UEs, wherein the second request was made while the one of the second UEs was connected to a RAT of the first RAT type; and
    responding to the second request by acknowledging the second request and allowing a communication session associated with the second request.

5. The method of claim 3, wherein responses to the requests from the second UEs include instructions to fallback to a RAT of the first RAT type.

6. The method of claim 1, wherein the core network is a fifth generation (5G) core network, the node is a session management function (SMF), and the other node is a network function (NF) of the 5G core network.

7. The method of claim 6, wherein the NF is a user plane function (UPF) and the determining further comprises:
    receiving a request from one of the first UEs or the second UEs;
    sending a message associated with the request to the UPF; and
    determining that the SMF has received a response from the UPF indicating that a user plane is congested.

8. The method of claim 6, wherein the NF is one of a unified data management (UDM) function, a charging function (CHF), or a policy control function (PCF), the first RAT type is fourth generation (4G) and the second RAT type is fifth generation (5G).

9. The method of claim 1, wherein the core network is a fourth generation (4G) core network, the first RAT type is one of third generation (3G) or second generation (2G), and the second RAT type is 4G.

10. The method of claim 1, further comprising configuring the node to adjust prioritization of RAT types associated with failures of the other node or set prioritization of RAT types for failures of an additional node of the core network.

11. A session management node of a core network, comprising:

a processor; and programming instructions configured to be executed by the processor to perform operations including:

receiving a request from a user equipment (UE);

sending a message associated with the request to another node of the core network;

determining that the session management node has received a negative response or no response from the other node of the core network;

determining a radio access technology (RAT) type of a RAT that the UE is connected to;

based at least in part on the negative response or no response from the other node, and when the RAT type is a first RAT type, granting the request from the UE; and based at least in part on the negative response or no response from the other node, and when the RAT type is a second RAT type, denying the request from the UE, wherein the session management node prioritizes UEs connected to the first RAT type over UEs connected to the second RAT type, wherein the first RAT type and the second RAT type are different RAT types.

12. The session management node of claim 11, wherein the core network is a fifth generation (5G) core network, the session management node is a session management function (SMF), and the other node is a network function (NF) of the 5G core network.

13. The session management node of claim 12, wherein the NF is one of a unified data management (UDM) function, a charging function (CHF), or a policy control function (PCF), the first RAT type is fourth generation (4G), and the second RAT type is 5G.

14. The session management node of claim 12, wherein the NF is a user plane function (UPF), the negative response indicates that a user plane is congested, and the first RAT type is 5G.

15. The session management node of claim 11, wherein the operations further include receiving, responsive to denying the request, a renewed request from the UE, wherein the UE has fallen back to a RAT of the first RAT type prior to making the renewed request.

16. The session management node of claim 11, wherein the core network is a fourth generation (4G) core network, the first RAT type is one of third generation (3G) or second generation (2G), and the second RAT type is 4G.

17. The session management node of claim 11, wherein the operations further include configuring the session management node to adjust prioritization of RAT types associated with failures of the other node or set prioritization of RAT types for failures of an additional node of the core network.

18. A non-transitory computer storage medium having programming instructions stored thereon which, when executed by a processor associated with a session management function (SMF) of a fifth generation (5G) core network, cause the SMF to perform operations comprising:

determining that there has been a failure of a network function (NF) of the 5G core network; and in response to the failure of the NF and based on radio access technology (RAT) types that user equipment (UEs) are connected to, prioritizing access by first UEs connected to a first RAT type over access by second UEs connected to a second RAT type, wherein the first RAT type and the second RAT type are different RAT types.

19. The non-transitory computer storage medium of claim 18, wherein the determining further comprises:

receiving a request from one of the first UEs or the second UEs;

sending a message associated with the request to the NF; and determining that the SMF has received a negative response or no response from the NF.

20. The non-transitory computer storage medium of claim 18, wherein the prioritizing comprises responding to requests from the second UEs with denials of communication sessions requested by the second UEs.

* * * * *